United States Patent [19]

Goldbach et al.

[11] 4,421,038

[45] Dec. 20, 1983

[54] METHOD AND APPARATUS FOR REMOVING FOREIGN OBJECTS FROM FLUID BED SYSTEMS

[75] Inventors: Gary O. Goldbach, San Jose; Michael A. O'Hagan, Cupertino, both of Calif.

[73] Assignee: Combustion Power Company, Inc., Menlo Park, Calif.

[21] Appl. No.: 419,873

[22] Filed: Sep. 20, 1982

[51] Int. Cl.$^3$ .............................................. F23G 7/00
[52] U.S. Cl. .................................. 110/245; 110/220; 110/259
[58] Field of Search .................. 110/245, 220, 259; 432/58; 122/4 D

[56] References Cited

U.S. PATENT DOCUMENTS

| 3,397,657 | 8/1968 | Tada | 110/245 |
| 3,577,939 | 5/1971 | Muirhead | 110/245 |
| 4,075,953 | 2/1978 | Sowards | 110/245 |
| 4,196,676 | 4/1980 | Brown et al. | 110/245 |
| 4,227,488 | 10/1980 | Stewart et al. | 110/245 |
| 4,267,801 | 5/1981 | Robinson | 110/245 |
| 4,273,073 | 6/1981 | Robinson | 122/4 D |

Primary Examiner—Henry C. Yuen
Attorney, Agent, or Firm—Limbach, Limbach and Sutton

[57] ABSTRACT

A foreign object removal system is disclosed including a removal chamber projecting laterally from the combustion chamber of a fluid bed reactor and connected via a downwardly directed pipe to a material flow control plenum chamber which includes means for fluidizing the mixture of inert fluid bed particles and foreign objects at the bottom of the pipe for lateral movement into an air classifier wherein the foreign objects are dropped to a collection tank and the fluid bed particles are carried upwardly by a stream of classifying air to a deentrainment chamber where their velocity is reduced and they are returned to the combustion chamber.

4 Claims, 8 Drawing Figures

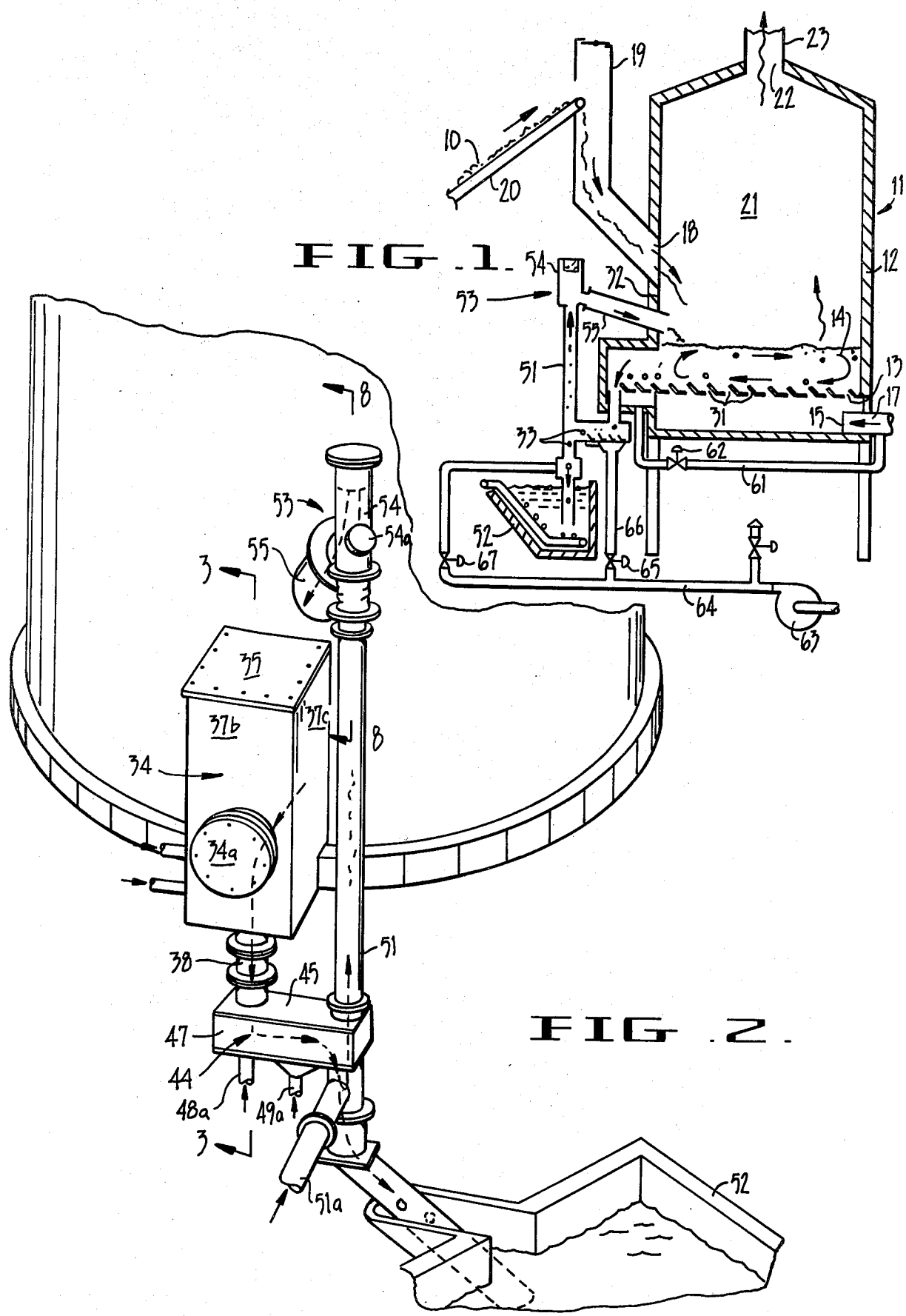

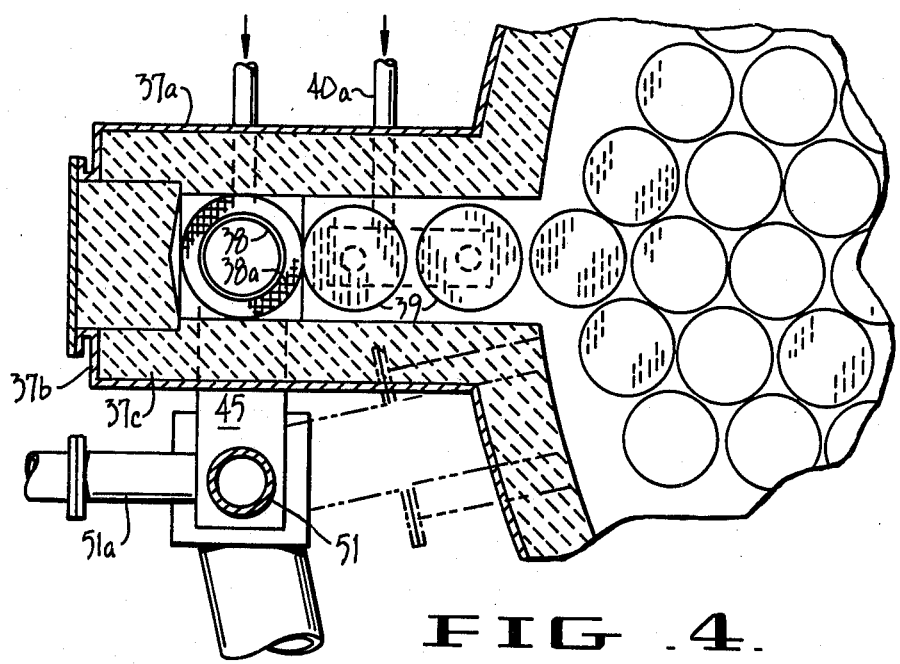
FIG. 4.
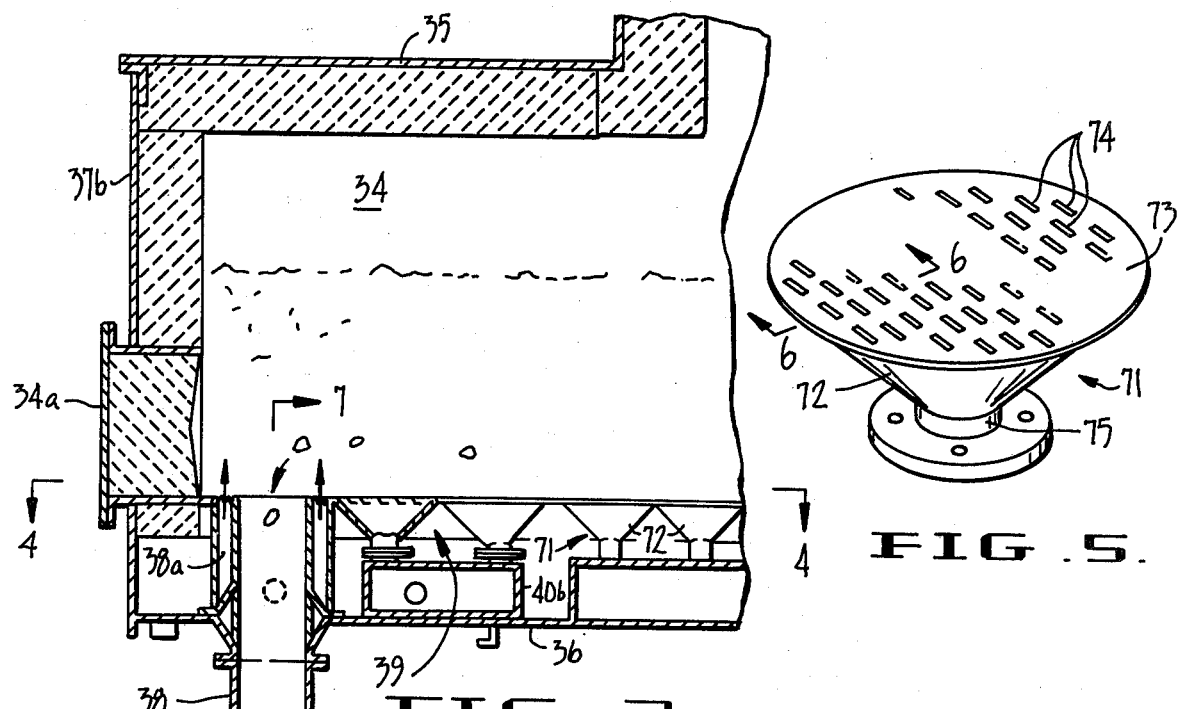
FIG. 3.
FIG. 5.
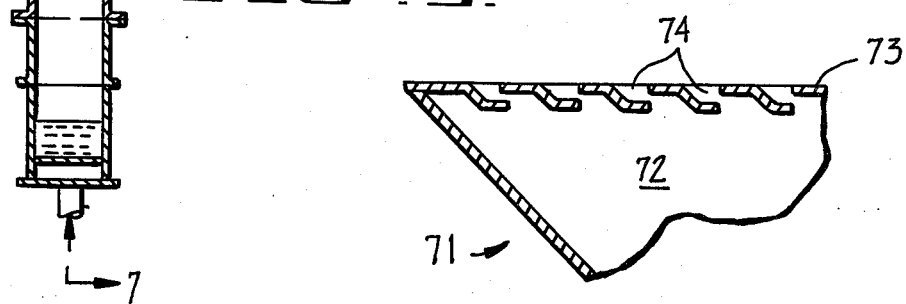
FIG. 6.

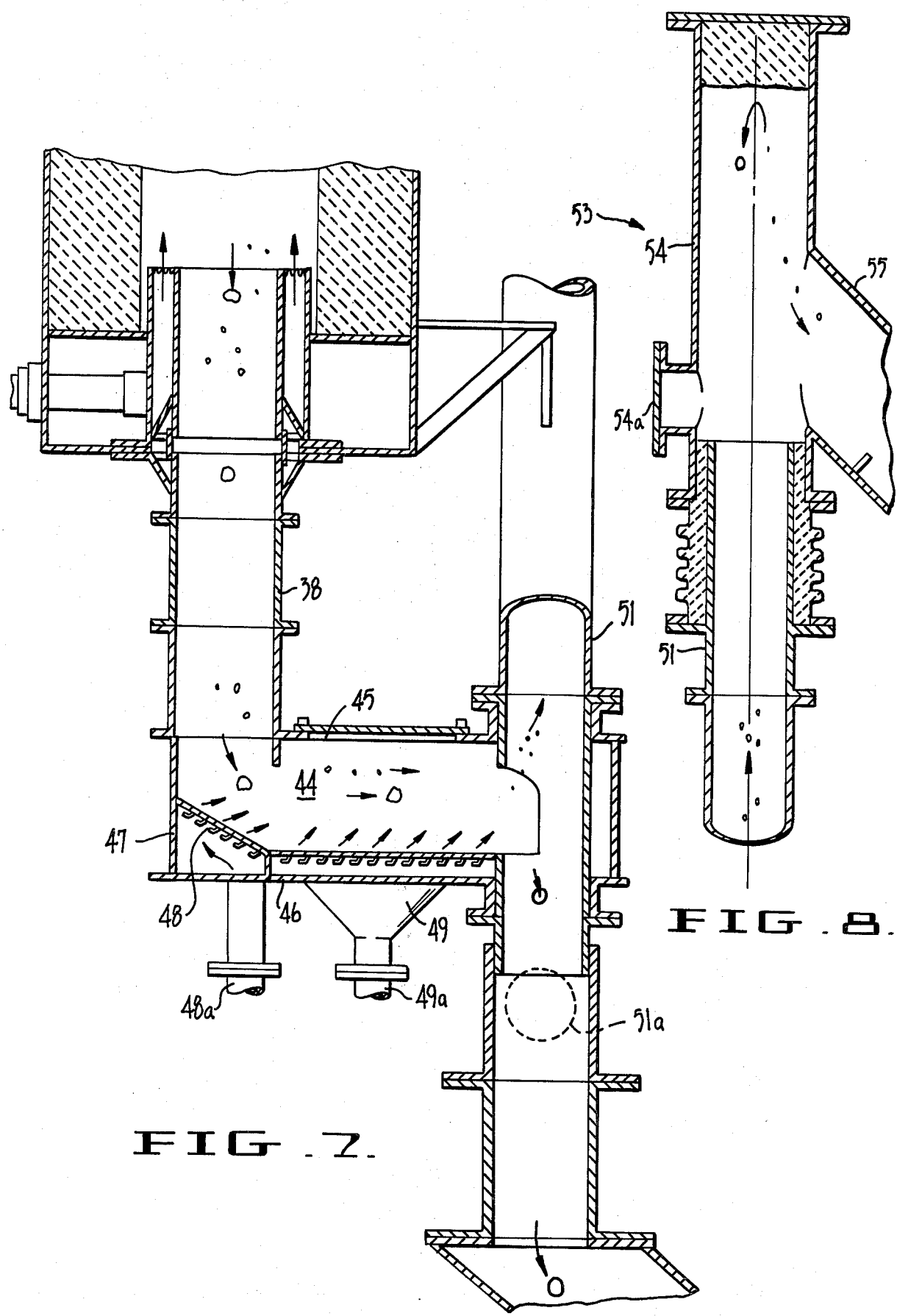

METHOD AND APPARATUS FOR REMOVING FOREIGN OBJECTS FROM FLUID BED SYSTEMS

DESCRIPTION

TECHNICAL FIELD

This invention relates in general to fluid bed combustion systems and more particularly to an improved system for removing foreign objects from the fluid bed.

BACKGROUND ART

Fluid bed reactor systems have been proposed in the past for combustion of various different types of materials. One such fluid bed reactor system is described in U.S. Pat. No. 3,589,313. Foreign objects or inerts which are introduced into the system through the material to be combusted collect in the fluid bed. Systems are proposed for removing such foreign objects in U.S. Pat. No. 4,196,676 assigned to the assignee of the present application. The systems disclosed in the latter patent suffer from a number of disadvantages. The particle flow through the removal system would plug up. Also fluid bed particles brought back into the fluid bed would cause mechanical damage and sometimes exit the fluid bed via the opening in the top of the combustion chamber.

DISCLOSURE OF INVENTION

The object of the present invention is to provide an improved method and apparatus for removal of foreign objects from a fluid bed system.

Broadly stated the present invention comprises a foreign object removal chamber projecting laterally outwardly from the combustion chamber, a material flow control plenum chamber below the removal chamber, a first passageway connecting the removal chamber to a first end of the plenum chamber, and an air classifier and particle return system connecting the second end of the plenum chamber first to a collection tank below the plenum chamber for collection of the foreign objects and secondly to the combustion chamber for return of the inert particles making up the fluid bed. The plenum chamber is provided with means for introducing fluidizing air into the quantity of inert particles and foreign objects in a direction from the first end to the second end of the chamber.

One of the features and advantages of this invention lies in the fact that the passageway connecting the removal chamber and the plenum chamber serves to seal off the foreign object removal system from the fluid bed system. Another advantage lies in the fact that the fluidizing air introduced into the plenum chamber controls the movement of the inert particles and foreign objects and prevents the foreign object removal system from becoming plugged up.

Another feature and advantage of the present invention is the provision of a de-entrainment chamber means located in the system between the air classifier and the combustion chamber whereby the inert particles for the fluid bed are returned to the fluid bed chamber without damage to the chamber and without the possible loss of the inert particles from the chamber.

Additional objects, advantages and features of the present invention will become apparent when taken in conjunction with the drawings.

BRIEF DESCRIPTION OF THE DRAWINGS

FIG. 1 is a schematic elevational sectional view schematically illustrating the present invention.

FIG. 2 is an enlarged side elevational view showing a portion of the structure shown in FIG. 1.

FIG. 3 is an elevational sectional view of a portion of the structure shown in FIG. 2 taken along line 3—3 in the direction of the arrows.

FIG. 4 is a plan view, partly in section, of a portion of the structure shown in FIG. 3 taken along line 4—4 in the direction of the arrows.

FIG. 5 is a perspective view schematically illustrating one of the tuyere for introducing fluidizing air in the foreign object removal system.

FIG. 6 is an enlarged elevational sectional view of a portion of the structure shown in FIG. 5 taken along line 6—6 in the direction of the arrows.

FIG. 7 is an elevational sectional view of a portion of the structure shown in FIG. 3 taken along line 7—7 in the direction of the arrows.

FIG. 8 is an elevational sectional view of a portion of the structure shown in FIG. 2 taken along line 8—8 in the direction of the arrows.

BEST MODE FOR CARRYING OUT THE INVENTION

While it will be appreciated from the following detailed description that the present invention is applicable to combustion of different types of materials in fluid bed reactors, the invention is ideally suited to the combustion of low quality fuels which have a large proportion of foreign material or inert objects. Typical characteristics of such low quality fuels are high moisture levels such as up to 65% on an as-received basis, high inert levels such as up to 50% on a dry basis, and sizes from fines up to articles 18" in diameter and 6' long.

A system for burning such material is illustrated in FIG. 1 which shows a fluid bed reactor or combustion assembly 11 having an upstanding combustion chamber 12, typically cylindrical, which is provided in the lower interior portion thereof with a porous particle support structure 13 for supporting a bed of granular inert particles 14. A particle bed material for consuming combustible material such as lumber log yard debris, clarifier sludge, fly ash and char is crystalline beach sand. For cleaner combustible materials such as hog fuel and some coals, a refractory grog can be used. For higher sulfur fuels such as coal and shale, a limestone or dolomite material can be used to react with the sulfur and thereby eliminate emissions of sulfur dioxide. The height of the fluid bed can be varied to match combustion requirements of different fuels.

A first opening or fluidizing air inlet 15 is provided in the combustion chamber 12 below the porous support structure 13 for delivering a stream of air under pressure from the outlet of a fluidizing fan (not shown) via a conveying conduit or pipe 17. A second opening or fuel inlet 18 to the chamber 12 is provided for introducing combustible material into the combustion chamber 12 via an elevated feed chute or stack 19 into which the combustible material 10 is introduced via a conveyor 20.

Gaseous exhaust products from the combustion which takes place within the bed of particles 14 or the region 21 in the combustion chamber above the bed of particles 14 are drawn out of the chamber 12 through a third opening 22 in the top thereof via a pipe or conduit 23.

The porous support structure 13 for supporting and fluidizing the bed of particles 14 is provided with openings 31 which direct the air stream into the quantity of particles with a velocity vector directed toward one side 32 of the combustion chamber 12 for aiding in the removal of foreign objects 33 such as rocks, oversize inert members, tramp metal, etc. from the combustion chamber via a foreign object removal chamber 34 at the one side 32 of the combustion chamber 12.

It will be appreciated that the porous support structure can take one of a number of different forms. The structure may be a perforated distribution plate with angle openings or louvers to provide the desired sideways velocity vector or can consist of a plurality of tuyeres provided with top perforated members connected either to a duct or a main plenum. A tuyere or bed nozzle 71 is shown by way of example in FIGS. 5 and 6 with a conical chamber 72 provided with a louvered top surface 73 to provide the desired directional openings 74, and air is fed into the chamber 72 for passage out of the opening 74 from a feed pipe 75 which is connected through a distribution plate which subdivides the combustion chamber 12.

The apparatus for removing foreign objects from the fluid bed combustion system includes a foreign object removal chamber 34 projecting laterally beyond the sidewall 32 of the combustion chamber 12. Chamber 34 is formed by top and bottom walls 35 and 36, respectively, and three sidewalls 37A, 37B and 37C. Fluidizing means such as tuyeres 39 similar to tuyeres 71 in the fluid bed combustion chamber, are provided for laterally shifting the mixture of inert bed particles 14 and foreign objects 33 from a first end of the removal chamber 34 at the sidewall 32 of the combustion chamber to a second outboard end at the wall 37B. Fluidizing air is fed to the tuyeres 39 from an air conduit 40A and an air plenum 40B.

A vertically downwardly directed pipe or passageway 38 is provided at the second or outboard end of the chamber 34 for removing a mixture of the inert particles 14 and foreign objects 33 from the removal chamber 34. An annular air passage 38A is provided immediately surrounding the upper end of the pipe 38 to keep the top of the pipe clear from obstruction and plugging.

The lower end of pipe 38 is connected to one or a first end 44A of a material flow control plenum 44 formed by top and bottom walls 45 and 46, respectively, and a pair of sidewalls 47. The plenum 44 is provided with means for fluidizing the lower end of the column of mixed inert particles and foreign objects entering the plenum from the pipe 38. The fluidizing means includes an apertured angled plate 48 directly at the bottom of pipe 38 and a tuyere 49 covering the remaining bottom surface of the chamber 44. Both the plate 48 and the tuyere 49 include surfaces with angled openings for air from air supply ducts 48A and 49A, respectively, directed so that the air flow is from the first end of the chamber 44 beneath the pipe 38 to a second end of the chamber 44 into an air classifier passage 51.

The air classifier passage includes a vertical pipe 51 extending from a foreign object collection tank 52 located below the plenum chamber 44 to an inert particle deentrainment device 53 located above the plenum chamber 44. The lower end of the pipe 51 projects into a fluid material such as water in the tank 52 or a sealed container for sealing off air communications out through the lower end of the pipe 51. A conveyor can be provided with its initial pickup portion beneath the lower end of pipe 51 for removal of the foreign objects 33 from the tank 52.

An air stream for the air classifying pipe 51 is introduced via an air supply pipe 51A into the pipe 51 below the plenum chamber 44. The plenum chamber 44 is a fluidizing conveyor which controls the delivery of material to the classifying air stream in pipe 51. The upwardly directed air classifying stream in pipe 51 will pick up inert particles from the outbound end of the plenum chamber 44 and carry them upwardly while permitting the heavier foreign objects to drop down in pipe 51 to the tank 52.

The deentrainment device 53 includes structure for reducing the velocity of the inert particles originally from the fluid bed and returning them to the fluid bed. In the preferred embodiment illustrated, the deentrainment device or chamber 53 includes an enlarged diameter pipe section 54 at the top of the pipe 51 and which opens into an enlarged diameter angled return pipe 55 leading from the enlarged diameter pipe 54 to the chamber 51. By way of illustrative example, for an air classifier pipe 51 eight inches in diameter and carrying air flow of 1050 cubic feet per minute, the deentrainment chamber 53 includes an enlarged diameter pipe 54 approximately four feet long and twelve inches in diameter and an enlarged diameter angled extension pipe 55 approximately two and a half feet long and also twelve inches in diameter.

Insulation is provided at various walls and expansion joints in various pipes because of the elevated temperature in the combustion chamber and access ports are provided at various locations such as an access port 34A to the removal chamber 34 and access port 54a to pipe 54 of the deentrainment device.

FIG. 1 schematically illustrates the air supply connection to various parts of the system. An air conduit 61 from the pipe 17 passes an air supply through a control valve 62 to the input tube 40A to the tuyeres 39 in the removal chamber 34. A separate air supply from a blower 63 provides the air to the control plenum chamber 44 in the air classifier tube 51. This air is conducted via a line 64 and through a valve 65 and branch line 66 to the input to pipes 48A and 49A for the plenum chamber 44. Air from pipe 64 is controlled through valve 67 and connected to the input pipe 51A to the air classifier pipe.

In the operation of the present invention when the bed of inert particles 14 has previously been heated, the combustible material 10 moves into the bed of particles 14 fluidized by the air stream from the fan 16 whereby the combustible material is heated to ignition temperature and combustion takes place. The foreign objects 33 sink to the bottom of the fluid bed and are conveyed to one side of the combustion chamber 12 and are removed via the removal chamber 34. The mixture of inert fluid bed particles and foreign objects are moved laterally of the removal chamber 34 and fill up the pipe 38. In foreign object removal either intermittently or continuously the fluidizing air introduced via the openings in plate 48 and tuyere 49 move the mixture to the opposite end of plenum chamber 44 into the air classifier tube 51. The heavier foreign objects drop down the top into the tank 52 while the lighter inert fluid bed particles are raised by the classifying air stream to the deentrainment chamber 53 where the particles slow down and are turned into the downwardly angled pipe 55 and are returned to the combustion chamber.

We claim:

1. In a fluid bed combustion apparatus having, an upstanding combustion chamber, a porous support structure within the combustion chamber supporting a quantity of finely divided inert particles, a first opening into the combustion chamber below the porous structure for introducing a stream of air for passage up through the porous support structure for fluidizing the quantity of particles, a second opening into said combustion chamber for introducing combustible material which contains foreign objects, a third opening at the top of the combustion chamber above the particles for passing products of combustion out of the combustion chamber, a foreign object removal opening for removal of foreign objects from the quantity of particles from one side of the combustion chamber, and means at a plurality of locations beneath the quantity of particles for introducing fluidizing air into the quantity of particles in a lateral direction toward said foreign object removal opening, the improvement comprising a foreign object removal chamber projecting laterally outwardly from said combustion chamber, a material flow control plenum chamber below said removal chamber, and having a first and a second end, a foreign object collection tank located below said control plenum, a first passageway means connecting said removal chamber to said first end of said plenum chamber for passing inert particles and foreign objects out of said combustion chamber, particle separation and return means connecting said second end of said plenum chamber with both said combustion chamber and said collection tank for separating foreign objects which move to said tank from inert particles which move to said combustion chamber, and means at a plurality of locations in the bottom of said plenum chamber for introducing fluidizing air into a quantity of inert particles and foreign objects in a direction from said first end to said second end of said plenum chamber.

2. In the apparatus of claim 1 said particle separation and return means including an air classifier means for elevating inert particles above said plenum chamber back into said combustion chamber and dropping foreign objects into said tank.

3. In the apparatus of claim 2 a deentrainment chamber means located above said control plenum for deentraining inert particles from a classifying stream of air in said air classifier means and connected to said air classifier means, and a second passageway means connecting said deentrainment chamber with said combustion chamber for returning inert particles to said combustion chamber.

4. In a fluid bed combustion apparatus having, an upstanding combustion chamber, a porous support structure within the combustion chamber supporting a quantity of finely divided inert particles, a first opening into the combustion chamber below the porous structure for introducing a stream of air for passage up through the porous support structure for fluidizing the quantity of particles, a second opening into said combustion chamber for introducing combustible material which contains foreign objects, a third opening at the top of the combustion chamber above the particles for passing products of combustion out of the combustion chamber, a foreign object removal opening for removal of foreign objects from the quantity of particles from one side of the combustion chamber, and means at a plurality of locations beneath the quantity of particles for introducing fluidizing air into the quantity of particles in a lateral direction toward said foreign object removal opening, the improvement comprising a foreign object removal chamber projecting laterally outwardly from said combustion chamber, a material flow control plenum chamber below said removal chamber, and having a first and a second end, a deentrainment chamber means located above said control plenum for deentraining inert particles from a classifying stream of air, a foreign object collection tank located below said control plenum, a first passageway means connecting said removal chamber to said first end of said plenum chamber for passing inert particles and foreign objects out of said combustion chamber, a second passageway means connecting said deentrainment chamber with said combustion chamber for returning inert particles to said combustion chamber, air classifier means connecting said second end of said plenum chamber with both said deentrainment chamber and said collection tank for separating foreign objects which move to said tank from inert particles which move to said deentrainment chamber means, and means at a plurality of locations in the bottom of said plenum chamber for introducing fluidizing air into a quantity of inert particles and foreign objects in a direction from said first end to said second end of said plenum chamber.

* * * * *